US008866916B2

(12) United States Patent
Yokota

(10) Patent No.: US 8,866,916 B2
(45) Date of Patent: Oct. 21, 2014

(54) IMAGE OUTPUT APPARATUS, CONTROL METHOD, AND COMPUTER-READABLE STORAGE MEDIUM FOR PROVIDING AN OUTPUT OPERATION REGARDLESS OF A CONNECTION STATE BETWEEN APPARATUSES

(71) Applicant: Canon Kabushiki Kaisha, Tokyo (JP)

(72) Inventor: Akane Yokota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/964,152

(22) Filed: Aug. 12, 2013

(65) Prior Publication Data

US 2013/0329259 A1   Dec. 12, 2013

Related U.S. Application Data

(63) Continuation of application No. 12/992,015, filed as application No. PCT/JP2009/060724 on Jun. 5, 2009, now Pat. No. 8,531,533.

(30) Foreign Application Priority Data

Jun. 30, 2008   (JP) ................. 2008-171246

(51) Int. Cl.
*H04N 5/225*   (2006.01)
(52) U.S. Cl.
USPC ..................................... 348/207.2; 358/1.15
(58) Field of Classification Search
USPC ........ 348/207.99, 207.1, 207.2, 211.1–211.3; 725/105, 134; 455/41.2, 574; 710/74; 358/1.15
See application file for complete search history.

(56) References Cited

U.S. PATENT DOCUMENTS

| 7,852,503 B2 | 12/2010 | Iwami et al. ................. 358/1.15 |
| 8,085,413 B2 | 12/2011 | Yamada et al. .............. 358/1.13 |
| 2004/0070672 A1* | 4/2004 | Iwami et al. ............... 348/207.2 |

(Continued)

FOREIGN PATENT DOCUMENTS

| CN | 1487724 A | 4/2004 |
| JP | 2004-025590 A | 1/2004 |

(Continued)

OTHER PUBLICATIONS

International Search Report and Written Opinion for International Application No. PCT/JP2009/060724, dated Jul. 14, 2009.

(Continued)

*Primary Examiner* — Dennis Hogue
(74) *Attorney, Agent, or Firm* — Fitzpatrick, Cella, Harper & Scinto

(57) ABSTRACT

There is provided an image output apparatus characterized by comprising: first communication control means for controlling communication using a first protocol; second communication control means for controlling communication relating to an image using a second protocol; image output means for executing image output
processing based on an image supplied under the communication control by the second communication control means; and link control means for performing control relating to disconnection of the communication by each of the first communication control means and the second communication control means. When disconnection of the communication by the first communication control means is detected, the link control means holds disconnection processing of the communication by the second communication control means based on a state of the communication control relating to the image by the second communication control means.

14 Claims, 8 Drawing Sheets

(56) References Cited

U.S. PATENT DOCUMENTS

| | | | |
|---|---|---|---|
| 2004/0179103 A1 | 9/2004 | Endo et al. | 348/207.2 |
| 2004/0210691 A1* | 10/2004 | Fujii | 710/74 |
| 2005/0140789 A1 | 6/2005 | Yasuda | 348/207.2 |
| 2006/0025181 A1* | 2/2006 | Kalofonos et al. | 455/574 |
| 2006/0126102 A1 | 6/2006 | Sakuda | 358/1.15 |
| 2006/0285155 A1 | 12/2006 | Yamada et al. | 358/1.15 |
| 2007/0011679 A1 | 1/2007 | Abe | 718/100 |
| 2007/0149124 A1* | 6/2007 | Onozawa | 455/41.2 |
| 2007/0162949 A1 | 7/2007 | Nitta et al. | 725/134 |
| 2011/0149092 A1 | 6/2011 | Yokota | 348/207.2 |

FOREIGN PATENT DOCUMENTS

| | | |
|---|---|---|
| JP | 2004-129218 A | 4/2004 |
| JP | 2004-237713 A | 8/2004 |
| JP | 2004-322420 A | 11/2004 |
| JP | 2006-094376 A | 4/2006 |

OTHER PUBLICATIONS

Office Action from the Chinese Patent Office ("CNO") dated Mar. 14, 2013.

* cited by examiner

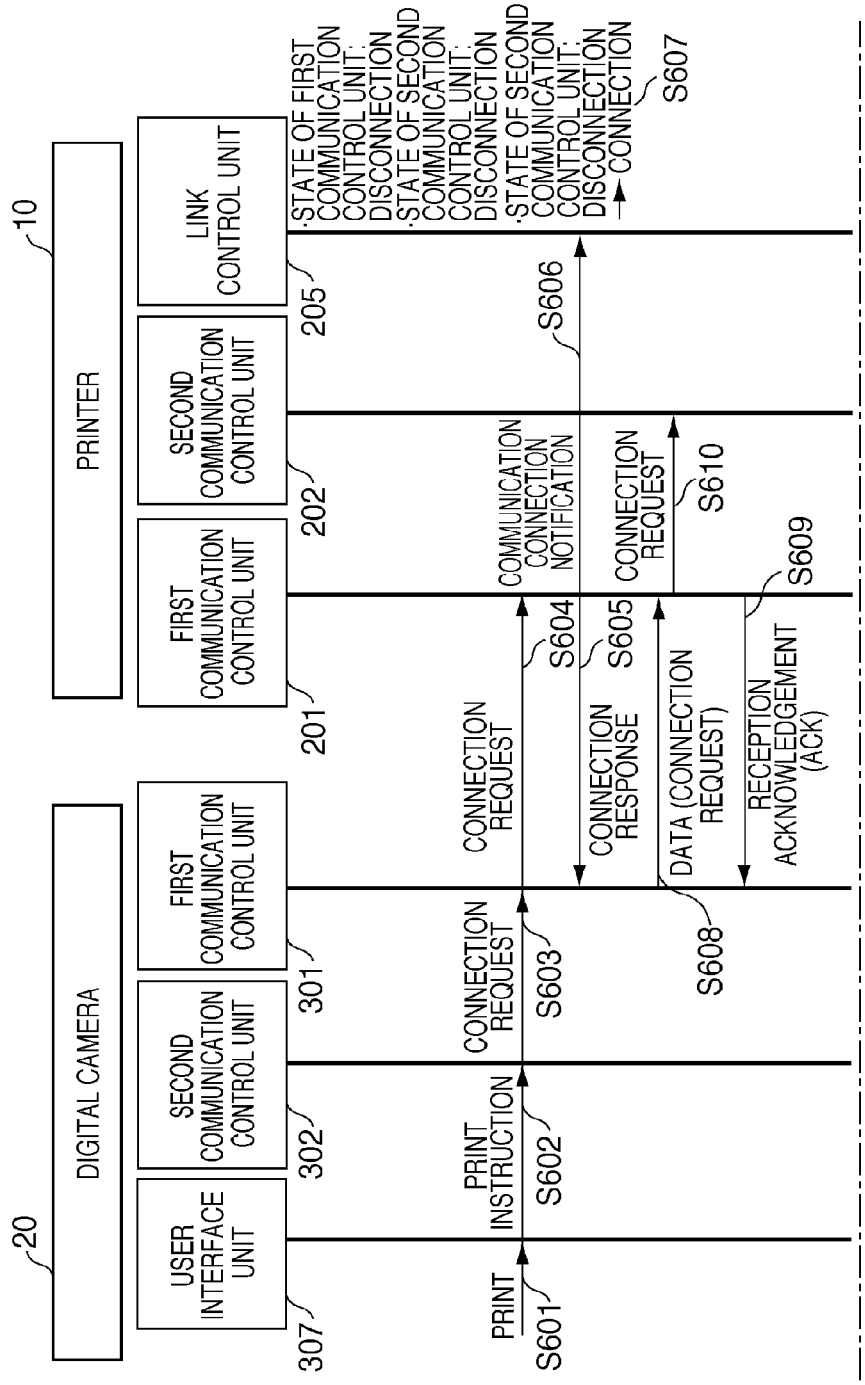

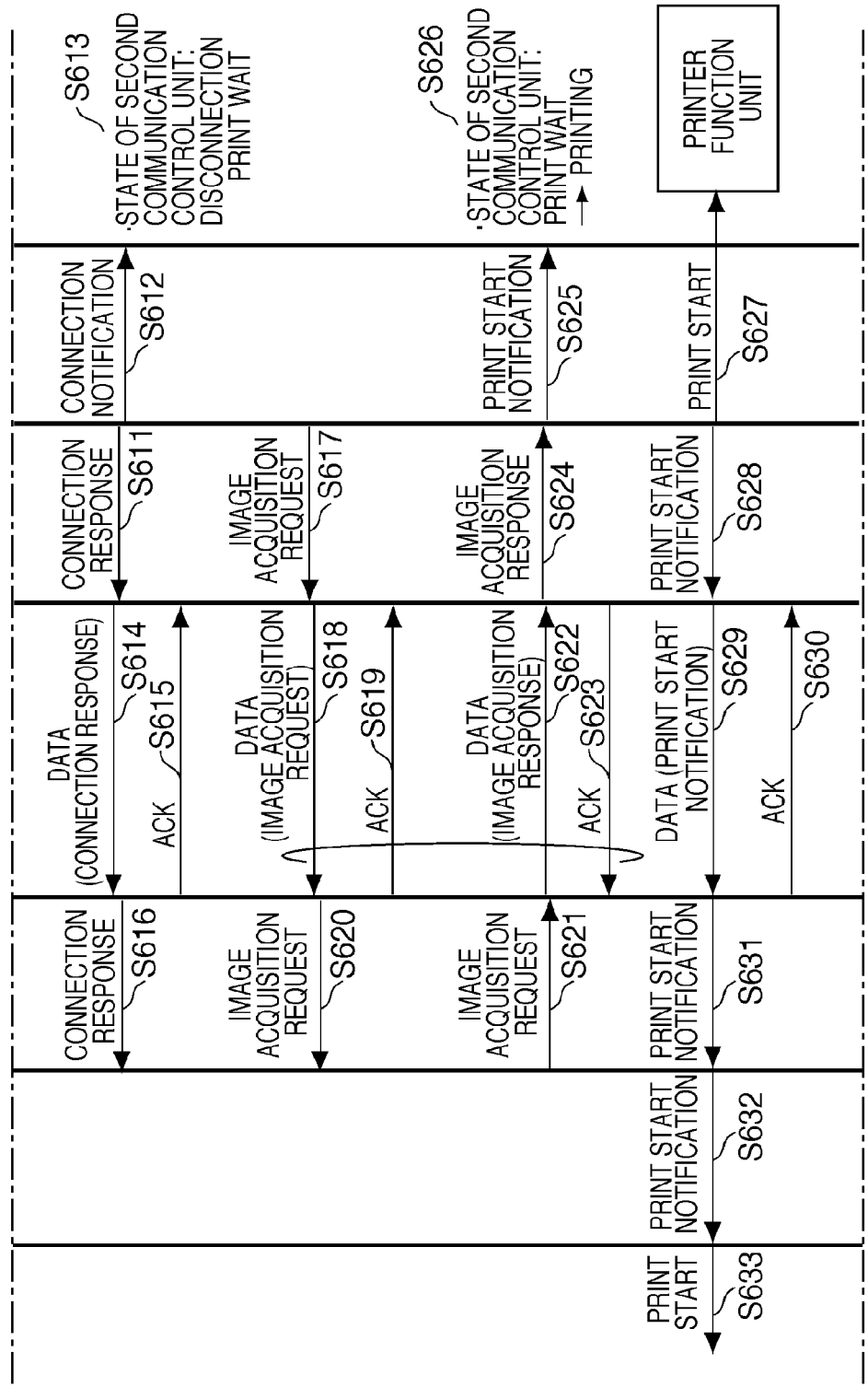

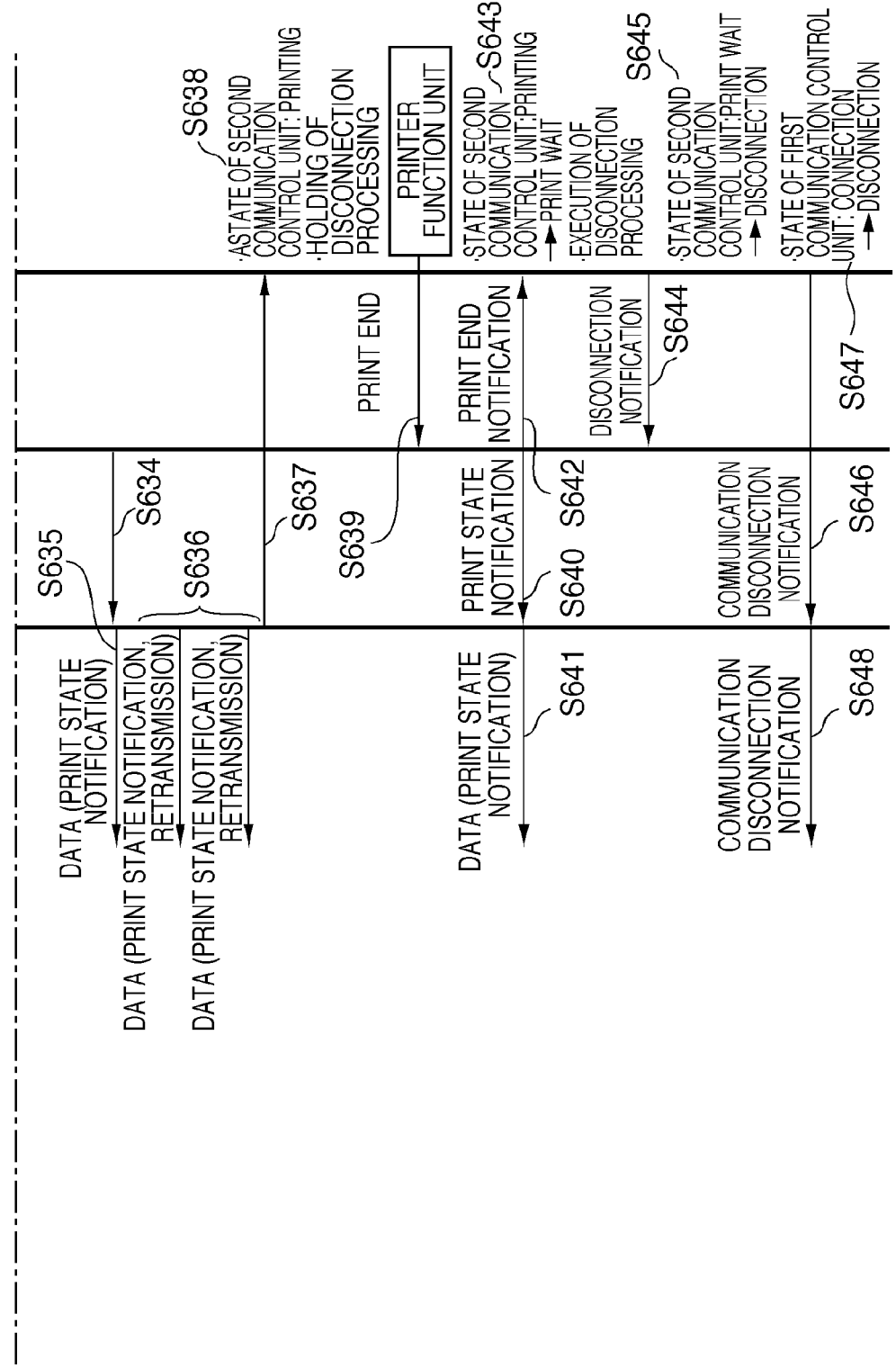

IMAGE OUTPUT APPARATUS, CONTROL METHOD, AND COMPUTER-READABLE STORAGE MEDIUM FOR PROVIDING AN OUTPUT OPERATION REGARDLESS OF A CONNECTION STATE BETWEEN APPARATUSES

CROSS REFERENCE TO RELATED APPLICATION

This application is a continuation of U.S. application Ser. No. 12/992,015 filed on Nov. 10, 2010, which is a National Stage of International Patent Application No. PCT/JP2009/060724 filed Jun. 5, 2009, which claims priority of Japanese Patent Application No. 2008-171246, filed Jun. 30, 2008. The entire disclosures of these prior applications are incorporated by reference herein.

TECHNICAL FIELD

The present invention relates to an image output apparatus, a control method, and a computer-readable storage medium.

BACKGROUND ART

A direct printing technique (e.g., PictBridge) of directly connecting a digital camera and a printer by a physical interface, and directly outputting an image captured by the digital camera from the printer without intervening a PC is known. At this moment, a USB (Universal Serial Bus) is the mainstream of the physical interface. Such direct printing technique, however, does not depend on the type of physical interface, and can also use a wireless interface in principle. As the direct printing technique, a technique which allows a digital camera to capture an object while a protocol for direct printing is executed is known (Japanese Patent Laid-Open No. 2006-94376).

Depending on a protocol for a direct printing technique, a digital camera may not be able to release a connection until print processing by a printer is completed even if image data transfer is complete. If, for example, a connection between the digital camera and the printer is disconnected during the print processing, a print error occurs, and a paper sheet midway through the print processing is discharged.

In particular, if a protocol for direct printing is executed using a wireless interface, a problem may arise. This is because if image data transfer from the digital camera to the printer is completed and then the user of the digital camera moves it away from the printer to disconnect a wireless connection, it is impossible to guarantee the operation of the printer.

DISCLOSURE OF INVENTION

The present invention provides a technique which can guarantee an output operation by an image output apparatus regardless of the connection state between apparatuses if image transfer is completed.

According to a first aspect of the present invention, there is provided an image output apparatus characterized by comprising: first communication control means for controlling communication using a first protocol; second communication control means for controlling communication relating to an image using a second protocol; image output means for executing image output processing based on an image supplied under the communication control by the second communication control means; and link control means for performing control relating to disconnection of the communication by each of the first communication control means and the second communication control means, wherein when disconnection of the communication by the first communication control means is detected, the link control means holds disconnection processing of the communication by the second communication control means based on a state of the communication control relating to the image by the second communication control means.

According to a second aspect of the present invention, there is provided an image output apparatus characterized by comprising: first communication control means for performing connection control of communication via a communication interface; second communication control means for controlling communication relating to an image using a communication path of a connection which has been established by the first communication control means; image output means for executing image output processing based on an image supplied under the communication control by the second communication control means; and link control means for performing control relating to disconnection of the communication by each of the first communication control means and the second communication control means, wherein when disconnection of the communication by the first communication control means is detected, the link control means holds disconnection processing of the communication by the second communication control means based on a state of the communication control relating to the image by the second communication control means.

According to a third aspect of the present invention, there is provided a control method for an image output apparatus, characterized by comprising: a first communication control step of controlling communication using a first protocol; a second communication control step of controlling communication relating to an image using a second protocol; an image output step of executing image output processing based on an image supplied under the communication control in the second communication control step; and a link control step of performing control relating to disconnection of the communication in each of the first communication control step and the second communication control step, wherein in the link control step, when disconnection of the communication in the first communication control step is detected, disconnection processing of the communication in the second communication control step is held based on a state of the communication control relating to the image in the second communication control step.

According to a fourth aspect of the present invention, there is provided a computer-readable storage medium storing a computer program which causes a computer to function as first communication control means for controlling communication using a first protocol, second communication control means for controlling communication relating to an image using a second protocol, and link control means for performing control relating to disconnection of the communication by each of the first communication control means and the second communication control means, and holding, when disconnection of the communication by the first communication control means is detected, disconnection processing of the communication by the second communication control means based on a state of the communication control relating to the image by the second communication control means.

Further features of the present invention will become apparent from the following description of exemplary embodiments with reference to the attached drawings.

BRIEF DESCRIPTION OF DRAWINGS

FIGS. 6A to 6C are sequence charts showing a processing sequence of the printer 10 shown in FIG. 1.

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Figure 1:
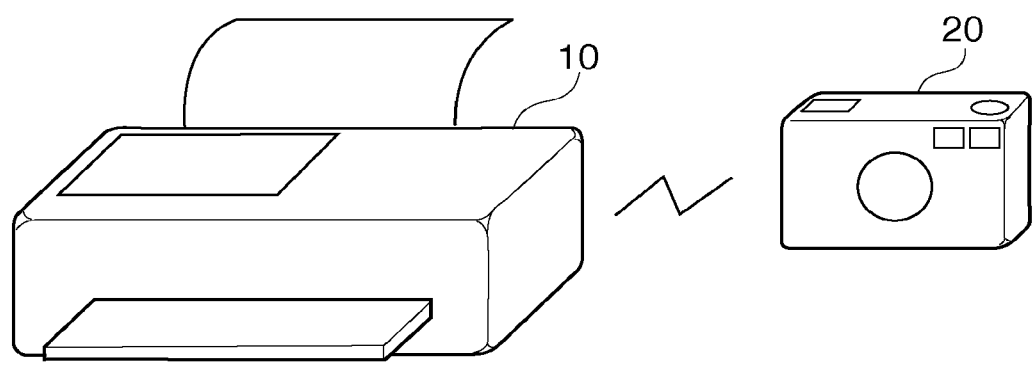
FIG. 1 is a view showing a configuration of an image output system including an image output apparatus according to the present invention.

FIG. 1 is a view showing a configuration of an image output system including an image output apparatus according to the present invention.

Reference numeral 20 denotes an image supply apparatus which supplies an image output apparatus 10 with an image to be output (printed). The image output apparatus 10 forms and outputs an image on a printing medium such as a paper sheet based on the image input from the image supply apparatus 20. The image output apparatus 10 and image supply apparatus 20 are connected with each other using a communication unit (not shown), thereby implementing a direct print function using the communication unit. In this embodiment, a case in which the image output apparatus 10 serves as a printer and the image supply apparatus 20 serves as a digital camera will be explained as an example.

Figure 2:
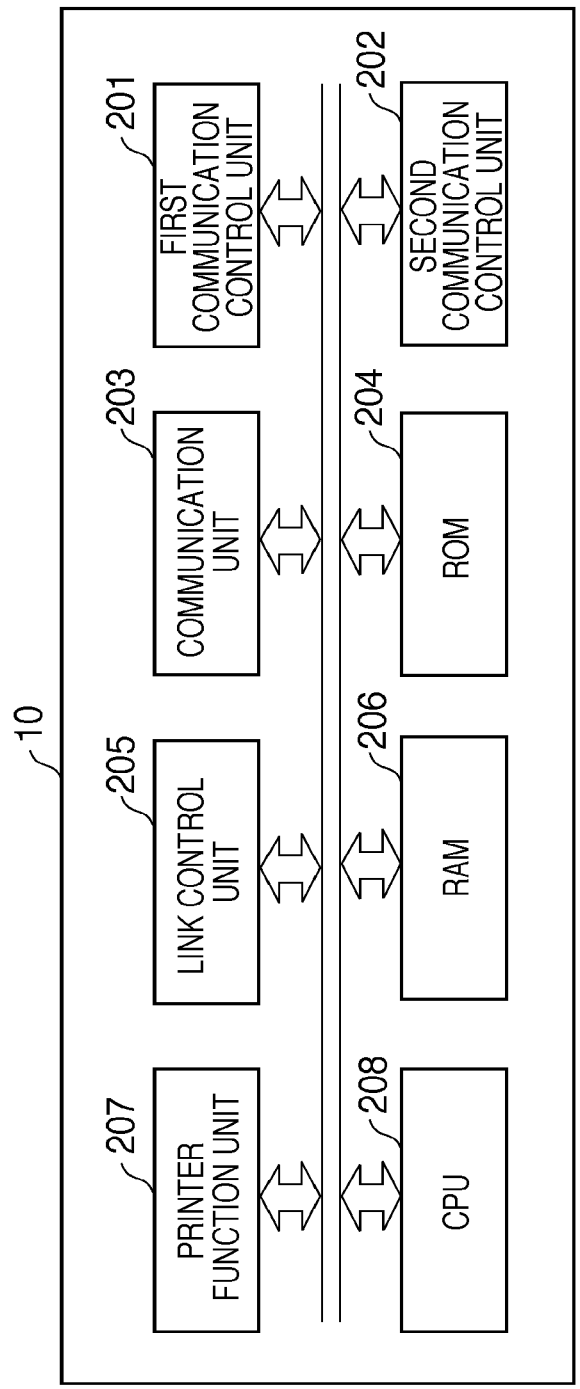
FIG. 2 is a block diagram showing an arrangement of the image output apparatus (a printer 10) shown in FIG. 1.

FIG. 2 is a block diagram showing an arrangement of the printer 10 shown in FIG. 1.

The printer 10 includes a first communication control unit 201, second communication control unit 202, communication unit 203, ROM 204, link control unit 205, RAM 206, printer function unit 207, and CPU 208.

The communication unit 203 serves as a communication interface. The first communication control unit 201 performs connection control of communication with a communication partner apparatus using a predetermined protocol (first protocol). For example, the first communication control unit 201 establishes a connection with the digital camera 20 via the communication unit 203.

The second communication control unit 202 controls communication relating to an image using a higher protocol (second protocol) of the protocol used for communication by the first communication control unit 201. For example, the unit 202 controls to receive an image transferred from the digital camera 20 side (to the self apparatus) and supply it to the printer function unit 207. The second communication control unit 202 controls the communication with the digital camera 20 using a communication path established by the communication unit 203 and first communication control unit 201.

The printer function unit 207 executes image output processing (to also be referred to as print processing hereinafter). That is, the unit 207 forms an image on a printing medium such as a paper sheet. The unit 207 executes print processing based on image data (a print image) which has been received from the digital camera 20 under the communication control by the second communication control unit 202.

The link control unit 205 manages the connection state in the first communication control unit 201 and a print processing state in the second communication control unit 202 while performing control relating to disconnection of the communication by each of the control units. The link control unit 205 manages two states, that is, "disconnection" and "connection", as communication control states (connection states) of the first communication control unit 201. The link control unit 205 also manages three states, that is, "disconnection", "print wait", and "printing", as communication control states (print processing states) of the second communication control unit 202.

The CPU 208 controls the printer 10 as a whole. The ROM 204 stores a processing procedure of the CPU 208. The RAM 206 is used as a work area for the CPU 208.

Figure 3:
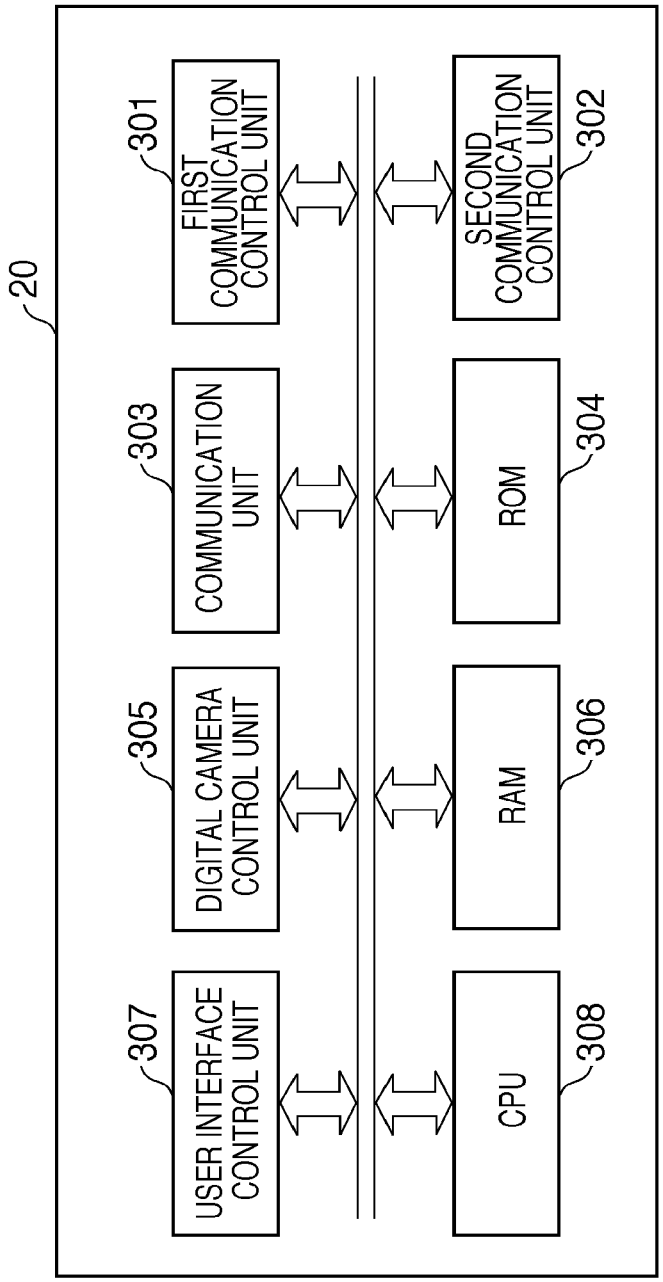
FIG. 3 is a block diagram showing an arrangement of an image supply apparatus (digital camera 20) shown in FIG. 1.

FIG. 3 is a block diagram showing an arrangement of the digital camera 20 shown in FIG. 1.

The digital camera 20 includes a first communication control unit 301, second communication control unit 302, communication unit 303, ROM 304, digital camera control unit 305, RAM 306, user interface control unit 307, and CPU 308.

The communication unit 303 serves as a communication interface. The first communication control unit 301 establishes a connection with a communication partner apparatus using the predetermined protocol (first protocol). The first communication control unit 301, for example, establishes a connection with the printer 10 via the communication unit 303.

The second communication control unit 302 controls communication (e.g., image transfer) relating to an image using a protocol (second protocol) higher than the protocol used for communication by the first communication control unit 301. The second communication control unit 302 controls the communication using a communication path established by the communication unit 303 and first communication control unit 301.

The digital camera control unit 305 controls the digital camera 20. The user interface control unit 307 functions as an interface connecting the user and the digital camera 20. The user interface control unit 307 has an input function of inputting a print instruction which has been transmitted by the user using the direct print function, and an output function of outputting various pieces of information transmitted from the printer 10.

The CPU 308 controls the digital camera 20 as a whole. The ROM 304 stores a processing procedure of the CPU 308. The RAM 306 is used as a work area for the CPU 308.

Figure 4:
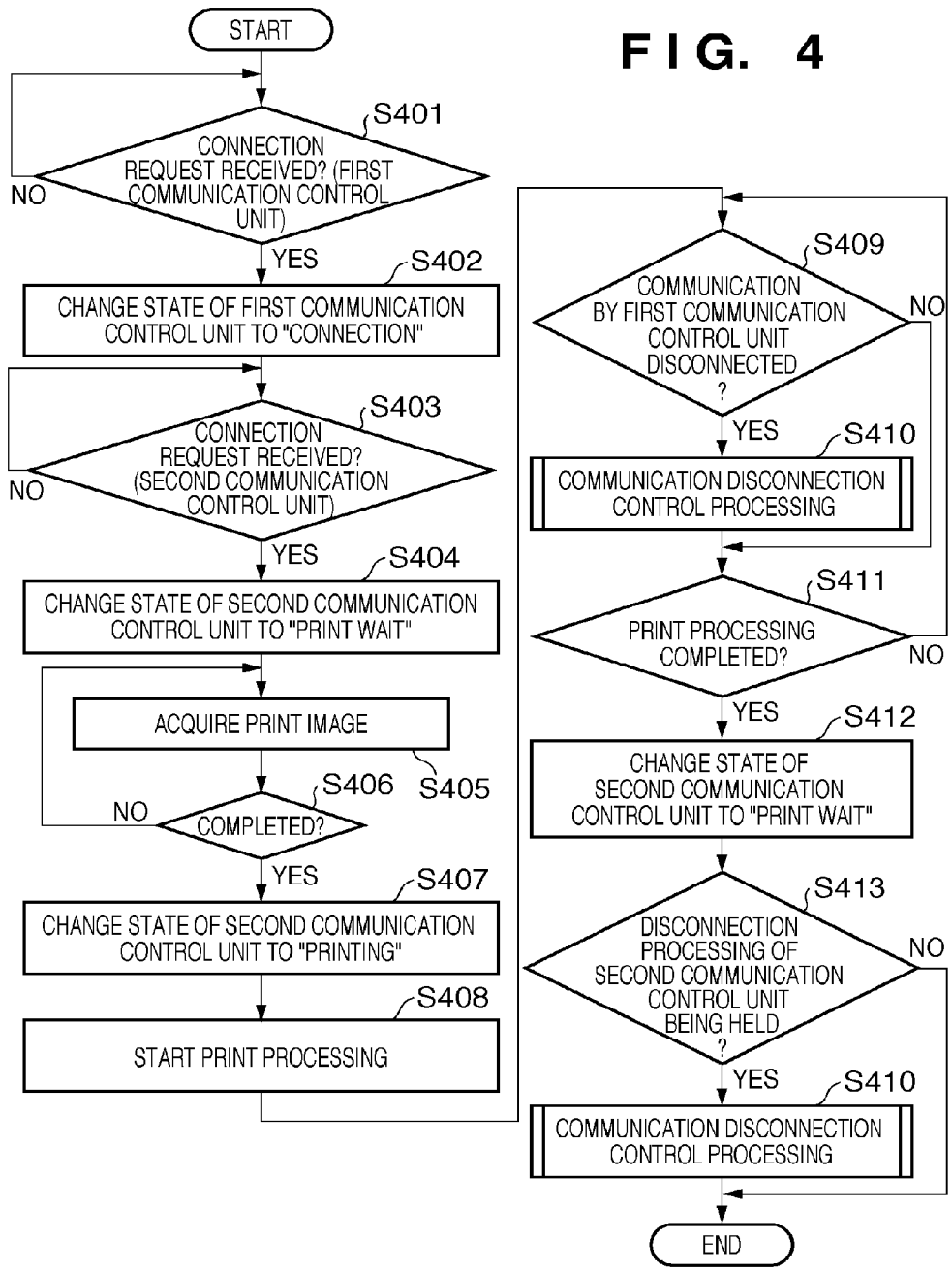
FIG. 4 is a flowchart illustrating a processing sequence of the image output apparatus (printer 10) shown in FIG. 1.

FIG. 4 is a flowchart illustrating a processing sequence of the printer 10 shown in FIG. 1. Processing when print processing by direct printing is executed based on a print image from the digital camera 20 will now be described.

In an initial state, the printer 10 waits until the first communication control unit 201 receives a connection request from a communication partner apparatus (the digital camera 20 in this embodiment) (NO in step S401). Upon receiving a connection request from the digital camera 20 during this wait time (YES in step S401), the link control unit 205 of the printer 10 changes the state of the first communication control unit 201 managed by itself to "connection" (step S402). After the state is changed, the printer 10 waits until the second communication control unit 202 receives, from the digital camera 20, a connection request for transferring a print image (NO in step S403).

Upon receiving a connection request (YES in step S403), the link control unit 205 of the printer 10 changes the state of the second communication control unit 202 managed by itself to "print wait" (step S404). After the state is changed, the second communication control unit 202 of the printer 10 executes print image acquisition processing (step S405). If the print image acquisition processing is completed (YES in step S406), the link control unit 205 of the printer 10 changes the state of the second communication control unit 202 managed by itself to "printing" (step S407). After that, the printer function unit 207 of the printer 10 starts print processing based on the received print image (step S408).

If, during the print processing, the communication by the first communication control unit 201 is disconnected, more specifically, the first communication control unit 201 transmits a disconnection notification to the link control unit 205 (YES in step S409), the printer 10 executes communication disconnection control processing (step S410). The communication disconnection control processing is executed in the link control unit 205, and details thereof will be described later. After that, if the print processing is completed (YES in step S411), the link control unit 205 of the printer 10 changes the state of the second communication control unit 202 managed by itself to "print wait" (step S412).

After the end of the print processing, the printer 10 determines whether the second communication control unit 202 is in a disconnection holding state. If the unit 202 is in a holding state (YES in step S413), the link control unit 205 executes the communication disconnection control processing (step S410), and the printer 10 ends this processing; otherwise (NO in step S413), the printer 10 ends this processing without any process.

Figure 5:
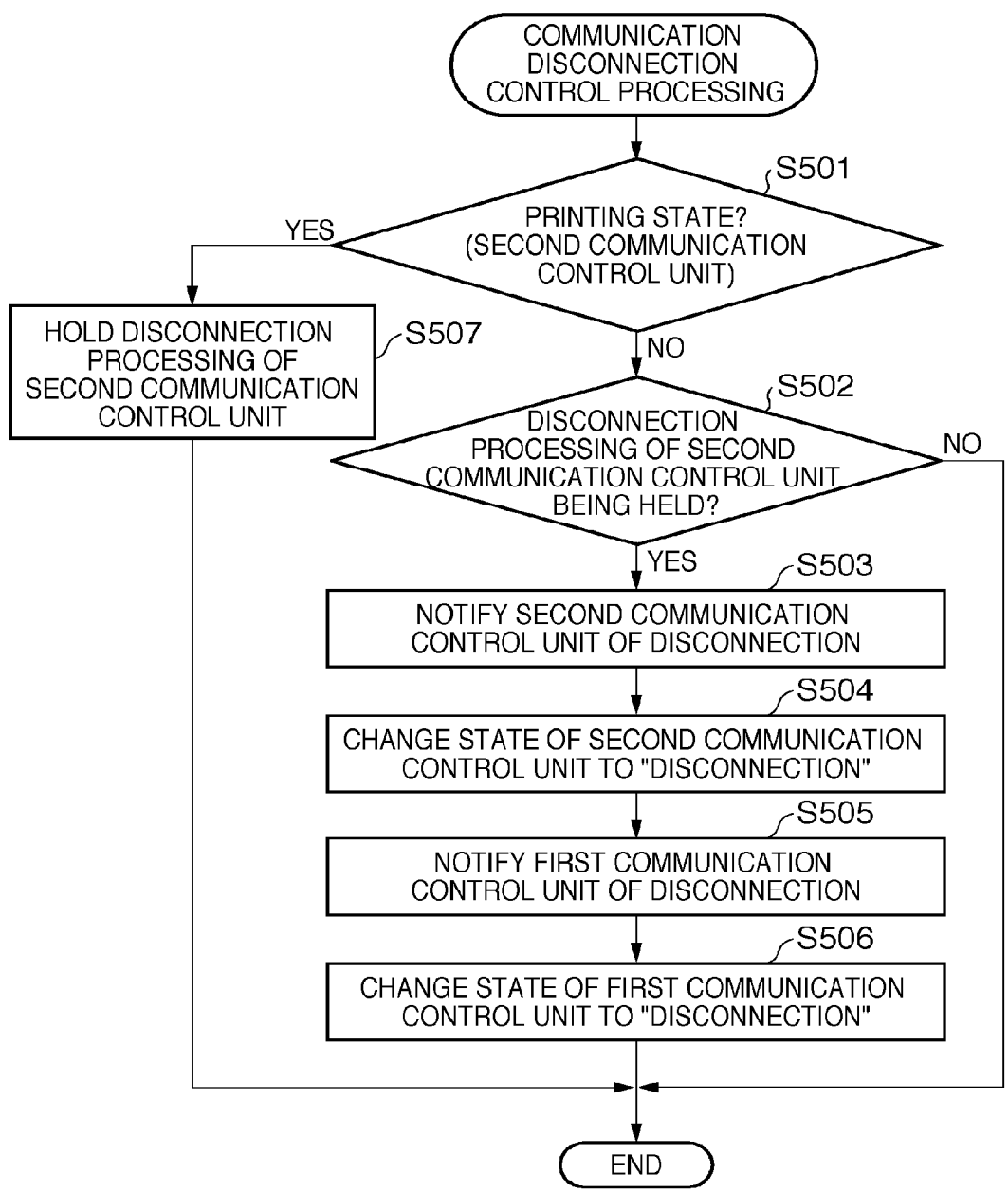
FIG. 5 is a flowchart illustrating a sequence of communication disconnection control processing in step S410 shown in FIG. 4.

FIG. 5 is a flowchart illustrating a sequence of the communication disconnection control processing in step S410 shown in FIG. 4. As described above, this processing is executed when a connection by the first communication control unit 201 is disconnected (YES in step S409) or disconnection processing by the second communication control unit 202 is being held (YES in step S413). If a connection by the first communication control unit 201 is disconnected, the first communication control unit 201 transmits a disconnection notification to the link control unit 205. This allows the link control unit 205 to grasp the connection state of the first communication control unit 201.

The link control unit 205 of the printer 10 checks whether the state of the second communication control unit 202 is "printing". If the state of the second communication control unit 202 is "printing" (YES in step S501), the unit 205 holds the disconnection processing of the second communication control unit 202 (step S507) and ends this processing; otherwise (NO in step S501), the unit 205 determines whether the disconnection processing of the second communication control unit 202 is being held.

As a result, if the disconnection processing is not being held (NO in step S502), the link control unit 205 ends this processing without any process; otherwise (YES in step S502), the link control unit 205 notifies the second communication control unit 202 of disconnection (step S503). Furthermore, the link control unit 205 changes the state of the second communication control unit 202 managed by itself to "disconnection" (step S504), and notifies the first communication control unit 201 of disconnection (step S505). After that, the link control unit 205 changes the state of the first communication control unit 201 managed by itself to "disconnection" (step S506), and ends this processing.

As described above, a connection by the first communication control unit 201 may be disconnected at an arbitrary timing (e.g., at a timing when the digital camera 20 is moved away from the printer 10) after the printer 10 receives a connection request from the digital camera 20. Upon receiving a disconnection notification from the first communication control unit 201, the link control unit 205 executes disconnection processing of the second communication control unit 202 and that of the first communication control unit 201. The link control unit 205 executes the disconnection processing at a timing depending on the communication control state, that is, the processing state, of the second communication control unit managed by itself. More specifically, if the state of the second communication control unit 202 is "printing" (i.e., an image is being supplied to the printer function unit 207), the disconnection processing is held until the state is changed from "printing". This prevents a problem of accidental print processing abortion when communication is disconnected during the print processing even though a print image has been received.

FIGS. 6A to 6C are sequence charts showing a processing sequence of the printer 10 shown in FIG. 1. A case in which the first communication control unit 201 transmits a disconnection notification to the link control unit 205 when the state of the second communication control unit 202 is "printing" will be explained as an example.

The link control unit 205 of the printer 10 manages "disconnection" as the state of the first communication control unit 201, and "disconnection" as the state of the second communication control unit 202. Assume that the user of the digital camera 20 operates the user interface control unit 307 to start direct printing between the digital camera 20 and the printer 10 (step S601).

The user interface control unit 307 of the digital camera 20 notifies the second communication control unit 302 of a print instruction based on the user operation (step S602). Then, the second communication control unit 302 notifies the first communication control unit 301 of a connection request to request to connect with the printer 10 (step S603). The first communication control unit 301 transmits a connection request to the printer 10 (step S604), and waits for a connection response from the opposing apparatus (printer 10).

Upon reception of the connection request from the digital camera 20, the printer 10 transmits a connection response (connection acknowledgement) from the first communication control unit 201 to the digital camera 20 (if it is possible to establish a connection) (step S605). At the same time, the first communication control unit 201 transmits a connection notification to the link control unit 205 (step S606). Upon reception of the notification, the link control unit 205 changes the state of the first communication control unit 201 to "connection" (step S607).

Meanwhile, the digital camera 20 receives the connection response from the printer 10 and transmits a connection request relating to print image transfer control from the first communication control unit 301 to the printer 10 (step S608). This connection request is transmitted using a data packet.

The printer 10 receives the data packet and transmits a reception acknowledgement (ACK) packet from the first communication control unit 201 to the first communication control unit 301 of the digital camera 20 (step S609). The first communication control unit 201 of the printer 10 transmits the received connection request to the second communication control unit 202 (step S610). The second communication control unit 202 receives the connection request and transmits a connection response (connection acknowledgement) (if it is possible to establish a connection) (step S611). At this time, the first communication control unit 201 transmits a connection notification to the link control unit 205 (step S612). Upon reception of the notification, the link control unit 205 changes the state of the second communication control unit 202 to "print wait" (step S613). The first communication control unit 201 which has received the connection response transmits a connection response relating to print image transfer control to the digital camera 20 (step S614). This connection response is transmitted using a data packet.

The digital camera 20 receives the connection response and transmits an ACK packet from the first communication control unit 301 to the first communication control unit 201 of the printer 10 (step S615). At this time, the first communication control unit 301 transmits the received connection response to the second communication control unit 302 (step S616).

Then, the printer 10 transmits an image acquisition request from the second communication control unit 202 to acquire a print image (step S617). The first communication control unit 201 receives the request and transmits an image acquisition request to the digital camera 20 (step S618).

Upon reception of the image acquisition request, the digital camera 20 transmits a reception acknowledgement (ACK) packet from the first communication control unit 301 to the first communication control unit 201 of the printer 10 (step S619). At this time, the first communication control unit 301 transmits the received image acquisition request to the second communication control unit 302 (step S620). The second communication control unit 302 receives the image acquisition request and transmits, to the first communication control unit 301, image data which has been designated by the user to be printed (step S621). The first communication control unit 301 receives the image data and transmits a print image as an image acquisition response to the printer 10 (step S622).

Upon reception of the print image (data packet), the printer 10 transmits a reception acknowledgement (ACK) packet from the first communication control unit 201 to the first communication control unit 301 of the digital camera 20 (step S623). At this time, the first communication control unit 201 transmits the received print image to the second communication control unit 202 (step S624). Note that the second communication control unit 202 of the printer 10 and the second communication control unit 302 of the digital camera 20 repeatedly execute the above processing in steps S617 to S624 until all print images are transmitted.

If the printer 10 receives all the print images, the second communication control unit 202 of the printer 10 transmits a print start notification to the link control unit 205 (step S625). The link control unit 205 receives this notification and changes the state of the second communication control unit 202 from "print wait" to "printing" (step S626). The second communication control unit 202 requests the printer function unit 207 to execute print processing based on the received print images (step S627). The printer function unit 207 then starts the print processing. At this time, the second communication control unit 202 notifies the first communication control unit 201 that the print processing has started (step S628). The first communication control unit 201 receives the notification and transmits a print start notification to the digital camera 20 using a data packet (step S629).

Upon reception of the print start notification, the digital camera 20 transmits a reception acknowledgement (ACK) packet from the first communication control unit 301 to the first communication control unit 201 of the printer 10 (step S630). At this time, the first communication control unit 301 also transmits the received print start notification to the second communication control unit 302 (step S631). This print start notification is finally transmitted to the user interface control unit 307 (step S632). With this processing, the user interface control unit 307 displays print start information on a display device to notify the user that the print processing has started (step S633).

Assume that the user which has looked at the display of the print start information moves the digital camera 20 away from the printer 10. This means that communication between the digital camera 20 and the printer 10 is disconnected. A processing sequence in the printer 10 when the communication is disconnected will be explained below.

As a print processing state changes, the printer 10 sends a notification about the print state from the second communication control unit 202 (step S634). The first communication control unit 201 receives the notification about the print state from the second communication control unit 202, transmits the notification to the digital camera 20 using a data packet, and waits for a reception acknowledgement (ACK) packet to the notification (step S635). If, for example, the first communication control unit 201 cannot receive the ACK packet, it retransmits the notification two or more times, and waits for the ACK packet (step S636). Assume that the first communication control unit 201 cannot receive the ACK packet even though it executes the retransmission processing for a predetermined period of time. In this case, the first communication control unit 201 determines that the communication with the digital camera 20 has been disconnected, and transmits a disconnection notification to the link control unit 205 (step S637). The link control unit 205 receives the notification and holds disconnection processing of the second communication control unit 202 (step S638). This is because the state of the second communication control unit 202 is "printing".

Upon completion of the print processing, the printer function unit 207 notifies the second communication control unit 202 of a print end (step S639). The second communication control unit 202 notifies the first communication control unit 201 of the print state (print end) (step S640). The first communication control unit 201 notifies the first communication control unit 301 of the digital camera 20 of the print state (step S641).

Upon being notified of the print end, the second communication control unit 202 notifies the link control unit 205 of the print end (step S642). The link control unit 205 receives the notification and changes the state of the second communication control unit 202 from "printing" to "print wait" (step S643). To execute the disconnection processing being held, the link control unit 205 transmits a disconnection notification to the second communication control unit 202 (step S644). After that, the link control unit 205 changes the state of the second communication control unit 202 to "disconnection" (step S645). Note that the second communication control unit 202 receives the disconnection notification and ends its processing, that is, print image transfer control. The link control unit 205 transmits a disconnection notification to the first communication control unit 201 (step S646), and also changes the state of the first communication control unit 201 to "disconnection" (step S647). The first communication control unit 201 receives the disconnection notification and transmits a disconnection notification to the first communication control unit 301 of the digital camera 20 (step S648). Then, this processing ends.

Typical embodiments of the present invention have been described above. However, the present invention is not limited to the aforementioned and illustrated embodiments, and can be properly modified without departing from the scope of the invention.

In the above-described embodiment, a case in which a connection request and connection response are used for processing of establishing a connection of the first communication control unit (201, 301), and a disconnection notification is used for a disconnection method has been explained as an example. The connection procedure and disconnection procedure, however, are not limited to them. The procedures comply with a connection procedure and disconnection procedure which are defined in communication protocols to be used, as a matter of course. As the first protocol controlled by the first communication control unit, a wireless communication protocol such as a wireless USB, 802.11 wireless LAN, Bluetooth, and RFID (Radio Frequency IDentification) can be used. In addition, for example, close proximity wireless transfer (noncontact close proximity communication) such as NFC (Near Field Communication) and TransferJet, and wired communication such as a USB may be used. As the second communication protocol controlled by the second communication control unit, an image transfer protocol such as Pict-Bridge, PTP (Picture Transfer Protocol), and FTP (File Transfer Protocol) can be used.

In the above-described embodiment, a case in which even after notifying that the communication with the digital camera 20 has been disconnected (step S637 in FIG. 6C), the first communication control unit 201 sends various notifications to the first communication control unit 301 of the communication partner apparatus has been explained. If, however, the first communication control unit 201 detects that the communication with the opposing apparatus has been disconnected, it may not execute packet transmission processing thereafter. The various notifications include a print state notification (step S641 in FIG. 6C) and a disconnection notification (step S648 in FIG. 6C). This can prevent unnecessary notification, thereby reducing power consumption.

In the above-described embodiment, when the first communication control unit 201 cannot receive the ACK packet even though it retransmits the data for the predetermined period of time, it detects disconnection. The present invention, however, is not limited to this. For example, the unit 201 may detect that the communication has been disconnected when it receives a negative acknowledgement (NACK) to the transmitted data, or a disconnection request or disconnection notification from the communication partner apparatus (the digital camera 20 in the embodiment).

In the above-described embodiment, a case in which if the first communication control unit 201 transmits a data packet, it must receive an ACK packet has been explained as an example. Depending on a data type to be transmitted, however, a packet which does not require an ACK may be used along with the above data packet.

In the above-described embodiment, a case in which after the connection processing of the second communication control unit 202 is executed (after step S615 in FIG. 6B), the second communication control unit 202 transmits an image acquisition request (step S617 in FIG. 6B) has been explained. The present invention, however, is not limited to this. That is, it is possible to adapt a sequence based on the specifications of direct printing performed between the printer 10 and the digital camera 20. For example, after the connection processing of the second communication control unit 202, both the printer 10 and the digital camera 20 may execute authentication processing, and then an image acquisition request sequence from the printer 10 side may be started. Furthermore, the printer 10 side may use, as a trigger, a print start request to be transmitted from the digital camera 20 side to start an image acquisition request sequence.

Although the image supply apparatus 20 and the image output apparatus 10 have been explained as examples in the above-described embodiment, an apparatus which is supplied with an image need not be the image output apparatus 10. An information processing apparatus may be used.

As described above, according to the embodiment, the digital camera 20 side can disconnect communication at an arbitrary timing after image data transfer is completed. The printer 10 side can complete print processing, even if the digital camera 20 disconnects communication at an arbitrary timing during the print processing. This can improve user convenience.

The present invention can adopt embodiments in the forms of, for example, a system, apparatus, method, program, and storage medium. The present invention may be applied to either a system constituted by a plurality of devices, or an apparatus consisting of a single device.

The present invention includes a case wherein the functions of the aforementioned embodiments are achieved when a software program is directly or remotely supplied to a system or apparatus, and a computer incorporated in that system or apparatus reads out and executes the supplied program codes. The program to be supplied in this case is a computer program corresponding to the illustrated flowcharts in the embodiments.

Therefore, the program codes themselves installed in a computer to implement the functional processing of the present invention using the computer also implement the present invention. That is, the present invention includes the computer program itself for implementing the functional processing of the present invention. In this case, the form of program is not particularly limited, and an object code, a program to be executed by an interpreter, script data to be supplied to an OS (Operating System), and the like may be used as long as they have the functions of the program.

As a computer-readable storage medium for supplying the computer program, various media can be used. As another program supply method, the user establishes connection to a website on the Internet using a browser on a client computer, and downloads the computer program of the present invention from the website onto a recording medium such as a hard disk.

The functions of the aforementioned embodiments can be implemented when the computer executes the readout program. In addition, the functions of the aforementioned embodiments may be implemented in collaboration with an OS or the like running on the computer based on an instruction of that program. In this case, the OS or the like executes some or all of actual processes, which implement the functions of the aforementioned embodiments.

According to the present invention, if image transfer is completed, it is possible to guarantee an output operation by an image output apparatus regardless of the connection state between apparatuses. This makes it possible to disconnect communication between the apparatuses at an arbitrary timing after the image transfer is completed. Even if the communication between the apparatuses is disconnected, the output operation is not terminated during its execution, thereby improving user convenience.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171246 filed on Jun. 30, 2008, which is hereby incorporated by reference herein in its entirety.

The invention claimed is:

1. An image output apparatus comprising:
a first communication control unit configured to control a wireless communication with another apparatus according to a first protocol;
a second communication control unit configured to control a communication relating to an image according to a second protocol conducted via the wireless communication according to the first protocol;
an image output unit configured to execute output processing of an image provided via a communication control by the second communication control unit;
a link control unit configured to defer disconnection processing of the communication by the second communication control unit, if disconnection of the wireless communication by the first communication control unit is detected, based on a state of the output processing by the image output unit; and
a notification unit configured to notify the another apparatus of a state of the output processing by the image output unit in accordance with a completion of the output processing by the image output unit and a state of the wireless communication controlled by the first communication control unit,
wherein, if the wireless communication by the first communication control unit is not disconnected during the output processing by the image output unit, the notification unit notifies the another apparatus of the state of the output processing by the image output unit in accordance with a completion of the output processing by the image output unit, and if the wireless communication by the first communication control unit is disconnected during the output processing by the image output unit, the notification unit restricts notification of the state of the output processing by the image output unit to the another apparatus even if the output processing by the image output unit is completed.

2. The apparatus according to claim 1, wherein the link control unit defers the disconnection processing by the second communication control unit during when the image output unit executes the output processing.

3. The apparatus according to claim 2, wherein the link control unit executes disconnection processing of the communication by the second communication control unit in response to the output unit completing the output processing.

4. The apparatus according to claim 1, further comprising:
a determining unit configured to determine whether the disconnection processing of the communication by the second communication control unit is deferred by the link control unit.

5. The apparatus according to claim 1, wherein the second communication control unit receives image data from a communication partner apparatus and provides the transferred image data to the image output unit.

6. A control method performed by an image output apparatus, the method comprising:
controlling a wireless communication with another apparatus according to a first protocol;
controlling a communication relating to an image according to a second protocol conducted via the wireless communication according to the first protocol;
executing output processing of an image provided via a communication control in the controlling of the communication relating to the image;
deferring disconnection processing of the communication in the controlling of the communication relating to the image, if disconnection of the wireless communication in the controlling is detected, based on a state of the output processing in the executing; and
notifying the another apparatus of a state of the output processing in accordance with a completion of the output processing by the executing and a state of the wireless communication controlled by the controlling of the wireless communication,
wherein, if the wireless communication is not disconnected during the output processing by the executing, the notifying notifies the another apparatus of the state of the output processing in accordance with a completion of the output processing, and if the wireless communication is disconnected during the output processing, the notifying restricts notification of the state of the output processing to the another apparatus even if the output processing is completed.

7. A non-transitory computer-readable storage medium storing a computer program that causes a computer to perform a method comprising:
controlling a wireless communication with another apparatus according to a first protocol;
controlling a communication relating to an image according to a second protocol conducted via the wireless communication according to the first protocol;
executing output processing of an image provided via a communication control in the controlling of the communication relating to the image;
deferring disconnection processing of the communication in the controlling of the communication relating to the image, if disconnection of the wireless communication in the controlling of the wireless communication is detected, based on a state of the output processing in the executing; and
notifying the another apparatus of a state of the output processing in accordance with a completion of the output processing by the executing and a state of the wireless communication controlled by the controlling of the wireless communication,
wherein, if the wireless communication is not disconnected during the processing by the executing, the notifying notifies the another apparatus of the state of the output processing in accordance with a completion of the output processing, and if the wireless communication is disconnected during the output processing, the notifying restricts notification of the state of the output processing to the another apparatus even if the output processing is completed.

8. An image output apparatus comprising:
a first communication control unit configured to control a wireless communication with another apparatus according to a first protocol;
a second communication control unit configured to control a communication relating to an image according to a second protocol conducted via the wireless communication according to the first protocol;
an image output unit configured to execute output processing of an image provided via a communication control by the second communication control unit from the another apparatus; and
a notification unit configured to notify the another apparatus of a state of the output processing by the image output unit in accordance with a completion of the output processing by the image output unit and a state of the wireless communication controlled by the first communication control unit;

wherein the image output unit continues the output processing even if disconnection processing of the wireless communication by the first communication control unit is detected, wherein, if the wireless communication by the first communication control unit is not disconnected during the output processing by the image output unit, the notification unit notifies the another apparatus of the state of the output processing by the image output unit in accordance with a completion of the output processing by the image output unit, and if the wireless communication by the first communication control unit is disconnected during the output processing by the image output unit, the notification unit restricts notification of the state of the output processing by the image output unit to the another apparatus even if the output processing by the image output unit is completed.

9. The apparatus according to claim 8, wherein the first communication control unit performs a wireless communication, which is compliant to IEEE802.11 series, with the another apparatus.

10. The apparatus according to claim 8, wherein the first communication control unit performs a wireless communication, which is compliant to Bluetooth, with the another apparatus.

11. The apparatus according to claim 8, wherein the first communication control unit performs a wireless communication, which is compliant to NFC (Near Field Communication), with the another apparatus.

12. The apparatus according to claim 8, wherein the second protocol is PTP (Picture Transfer Protocol) or FTP (File Transfer Protocol).

13. A method for an image output apparatus, comprising:
a first communication control step to control a wireless communication with another apparatus according to a first protocol;
a second communication control step to control a communication relating to an image according to a second protocol conducted via the wireless communication according to the first protocol;
an image output step to execute output processing of an image provided via a communication control by the second communication control step from the another apparatus; and
a notification step to notify the another apparatus of a state of the output processing by the image output step in accordance with a completion of the output processing by the image output step and a state of the wireless communication controlled by the first communication control step,
wherein the image output step continues the output processing even if disconnection processing of the wireless communication by the first communication control step is detected,
wherein, if the wireless communication by the first communication control step is not disconnected during the output processing by the image output step, the notification step notifies the another apparatus of the state of the output processing by the image output step in accordance with a completion of the output processing by the image output step, and if the wireless communication by the first communication control step is disconnected during the output processing by the image output step, the notification step restricts notification of the state of the output processing by the image output step to the another apparatus even if the output processing by the image output step is completed.

14. A non-transitory storage medium storing instructions which, when executed by a computer, cause performance of a method for an image output apparatus, the method comprising:
a first communication control step to control a wireless communication with another apparatus according to a first protocol;
a second communication control step to control a communication relating to an image according to a second protocol conducted via the wireless communication according to the first protocol;
an image output step to execute output processing of an image provided via a communication control by the second communication control step from the another apparatus; and
a notification step to notify the another apparatus of a state of the output processing by the image output step in accordance with a completion of the output processing by the image output step and a state of the wireless communication controlled by the first communication control step,
wherein the image output step continues the output processing even if disconnection processing of the wireless communication by the first communication control step is detected,
wherein, if the wireless communication by the first communication control step is not disconnected during the output processing by the image output step, the notification step notifies the another apparatus of the state of the output processing by the image output step in accordance with a completion of the output processing by the image output step, and if the wireless communication by the first communication control step is disconnected during the output processing by the image output step, the notification step restricts notification of the state of the output processing by the image output step to the another apparatus even if the output processing by the image output step is completed.

* * * * *